(12) United States Patent
Watanabe

(10) Patent No.: US 8,033,791 B1
(45) Date of Patent: Oct. 11, 2011

(54) BLADE END PORTION PROTECTING BAG AND A ROTOR INSTALLING METHOD FOR A WIND TURBINE

(75) Inventor: Naota Watanabe, Tokyo (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 12/841,330

(22) Filed: Jul. 22, 2010

(30) Foreign Application Priority Data

May 31, 2010 (WO) ...................... PCT/2010/059207

(51) Int. Cl.
*F04D 29/00* (2006.01)
(52) U.S. Cl. ...................................... 416/146 R; 416/62
(58) Field of Classification Search ...................... 416/62, 416/63, 146 R; 294/74, 77
See application file for complete search history.

(56) References Cited

U.S. PATENT DOCUMENTS

| 7,708,523 | B2 | 5/2010 | Sakaue |
| 2008/0216301 | A1 | 9/2008 | Hansen et al. |
| 2009/0025219 | A1 | 1/2009 | Hansen et al. |
| 2009/0282776 | A1 | 11/2009 | Berg |

FOREIGN PATENT DOCUMENTS

| JP | 2005-320919 A | 11/2005 |
| JP | 2006-21898 A | 1/2006 |
| JP | 2008-128253 A | 6/2008 |
| WO | 03/100249 A1 | 12/2003 |

OTHER PUBLICATIONS

International Search Report of Application No. PCT/JP2010/059207 mailed Aug. 17, 2010.

*Primary Examiner* — Edward Look
*Assistant Examiner* — Dwayne J White
(74) *Attorney, Agent, or Firm* — Kanesaka Berner and Partners LLP

(57) ABSTRACT

The subject of the present invention is to provide a blade end portion protecting bag which is fit onto an end portion of a plurality of blades for protecting the blade end portion from damage when the plurality of the blades are hoisted with a rotor head to the position of an upper nacelle in assembling a wind turbine, the protecting bag having such structure that a rope joint for connecting a control rope is hard to break and therefore the durability of the rope joint portion is improved; and a rotor installing method for installing the rotor to the nacelle with the protecting bag fit onto the blade. A blade end portion protecting bag which is fit onto an end portion of a plurality of blades in installing the blades 8 to the nacelle supported on the top of a tower 2, the protecting bag comprising an end bag 10 fit onto the end portion of at least one of a plurality of the blades 8 to cover the same in a predetermined length from the end of the blade, at least two belt-like members 11a to 11e disposed to radiate from a center portion P and fixed to the outer surface of the end bag 10 in its circumference, wherein the belt-like members are bunched up at the center portion, and a control rope is connected to the belt-like members at center portion P.

4 Claims, 5 Drawing Sheets

BLADE END PORTION PROTECTING BAG AND A ROTOR INSTALLING METHOD FOR A WIND TURBINE

RELATED APPLICATIONS

The present application is based on, and claims priority from, International Application Number PCT/JP2010/059207, filed May 31, 2010, the disclosure of which is hereby incorporated by reference herein in its entirety.

BACKGROUND OF THE INVENTION

1. Field of the Invention

The present invention relates to a blade end portion protecting bag for protecting a blade end portion in installing the rotor for a wind turbine, and a rotor installing method for installing the rotor to a nacelle with the rotor end portion protecting bag fit onto the rotor.

2. Description of the Related Art

Generally, a wind turbine generator includes a rotor equipped with blades to be rotated, a nacelle for accommodating a generator and the others, and a tower for supporting the nacelle.

When building a wind turbine, the rotor is hoisted to the position of the nacelle by a crane to install the rotor equipped with the blades to the nacelle. In this hoisting operation, there is some fear that the rotor equipped with the blades cannot stabilize its position because of the wind. Therefore, it is necessary to pull the blade end portions or the like via a rope in order to control the position of the rotor. The patent publication 1 is well known as a sample in which such position control of blades is performed by pulling the blade end portions via cable.

FIG. 6 shows a lifting state of blades of a wind turbine, which is shown in FIG. 8 of the Patent Publication 1 (Japanese Unexamined Patent Application Publication No. 2005-320919).

FIG. 6 shows a state in which the blades are lifted in substantially vertical direction by a crane so that the blades stand. When an attaching face 032 of a rotor head 03 is attached to an attaching face 034 of a nacelle 033 which is provided on the top of a tower 022, the top of the rotor head 13 is hoisted by a hoist cable 019 of a crane 025. Drawing force is applied to the rotor using the other drawing ropes 029, 031 to control the position of the rotor until the blades stand in substantially vertical direction, while the rotor is hoisted by the wire 019 of the crane 025 and a hoisting wire 028 of a crane 024, thereby standing the rotor in substantially vertical direction (A state shown in FIG. 6). Further, drawing force is applied to the rotor using the ropes 029, 031 to control the position of the rotor, until the attachment face 032 of the rotor is attached to the nacelle 034.

The technique disclosed in the Patent Publication 1 does not specify a method for fastening the ropes 029, 031 to the blade ends. In assembling the wind turbine, there is some fear that the blades may be damaged according to a method for holding the blade end portion or a method for drawing the ropes because the rear edge portion of the blade end portion is thin. Since it is impossible to fasten the rope directly to the blade end portion, the end bag 10s as shown in FIG. 5 is fitted onto the blade end portion.

In FIG. 5, the end bag 10s, which is made from a relatively soft material having high tension and oil resistance such as hemp material, etc., is fit onto the blade end portion of at least one blade 8, which is selected from the plurality of the blades 8, in a predetermined length from the end of the blade 8.

Rope joints 21a are sewed to a portion of an overlapped face 21c in the end bag 10s, and ropes 22 for applying drawing force to control the position of the blades are connected to the rope joints 21a.

PRIOR ART

Patent Publication 1

Japanese Unexamined Patent Application Publication No. 2005-320919

SUMMARY OF THE INVENTION

In the blade end portion protecting bag shown in FIG. 5, the drawing force tends to act directly to the back edge portion of the blade, thereby easily damaging the blade. Further, in such arrangement that the end bag 10s is fit onto the blade end portion and the ropes 22 is connecting to the end bag 10s via the rope joints 21a, if the drawing direction of the ropes 22a is changed as the position of the rotor changes, then the drawing force acts to such direction that adhesive bonding portion or sewing portion between the rope joint 21a and the end bag 10s is easily broken. Consequently, the rope joints 21a are torn off from the end bag 10s, and also the ropes 22 are broken away from the end bag 10s, thereby causing a problem that the position control of the rotor cannot be performed. Further, such change of the direction of the drawing force causes friction between the rope joints 21a and the ropes 22. Consequently, either the rope joints 21a or the ropes 22 are cut by the friction, thereby causing a problem that the position control of the rotor cannot be performed.

The present invention was made to solve the above problems, by providing, for a blade end portion protecting bag fit onto a blade end portion to prevent the blade end from being damaged when the blades are hoisted with the rotor to the position of a nacelle in assembling the wind turbine, a protecting bag having a shape which is able to decrease damage to the blade; a protecting bag having a structure in which a rope joint is hard to be broken off from the protecting bag; the blade end protecting bag which is able to decrease degradation damage to the lope joint portion and the rope to improve their durability; and a rotor installing method for installing the rotor to the nacelle.

A blade end portion protecting bag according to the present invention is for protecting a blade end portion of a rotor which is raised up to be installed in assembling a wind turbine, the blade end portion protecting bag comprising: an end bag fit onto the end portion of at least one of the blades to cover the same in a predetermined length from the end of the blade, at least two belt-like members disposed to radiate from a center portion virtually provided outside the end bag, the at least two belt-like members being fixed to the outer surface of the end bag in its circumference, wherein all of the foot portion of the belt-like members are bunched up at the center portion, and a control rope is connected to the belt-like members at the center portion.

In the present invention, at least two belt-like members fixed to the outer surface of the end bag in its circumference are disposed to radiate from a center portion virtually provided outside the end bag, and the at least two belt-like members extend straight. Therefore, even if the drawing direction of the control rope is changed minute by minute as the position of the rotor changes, it is possible to reduce acting a force of such direction that the adhesive bonding portion or sewing portion between the rope joint and the protecting bag is broken off and its damage is enlarged. Consequently, the durability of the end bag and the belt-like members can be improved.

Further, because the at least two belt-like members are disposed to radiate, a drawing force acting to the belt-like members and the end bag from the control rope is spread over a broad region of the blade end portion. Therefore, even if the drawing direction of the control rope is considerably changed, the drawing force is avoided from acting on a specified portion of the rear edge of the blade. Consequently, damage to the blade can be reduced.

Preferably, in the invention, the end bag may include a projecting portion formed by projecting a part of the opening end portion of the end bag so as to provide a space between the projecting portion of the end bag and a thin portion of the blade, that is, to provide a space by separating the opening end portion of the end bag, at which the largest drawing force against the rear edge of the blade acts, from the blade.

In such arrangement, the space is provided at the portion having the highest possibility to be damaged in normal protecting bag, and therefore the damage to the blade can be reduced.

Especially, the rear edge portion of the blade end portion is thin thereby being easily damaged. Therefore, it is most effective to provide such space at the rear edge side of the blade.

Preferably, in the present invention, a ring-like member to bunch up foot portions of the belt-like members may be provided at the center portion, wherein the control rope is connected to the ring-like member.

Such ring-like member is preferably made of metallic material or resin material having a low frictional coefficient, etc. Since a plurality of the foot portions of the belt-like members are bunched up via the ring-like member, the plurality of the belt-like members can move freely relative to the ring-like member and therefore the drawing force of the rope can be spread and transmitted to the belt-like members. In addition, the belt-like members are connected to the control rope via the ring-like member, and therefore a joint portion between the belt-like members and the control rope is prevented from being cut by friction between the control rope and the ring-like member, thereby enabling to improve the durability.

In another aspect of the invention, a rotor installing method for a wind turbine including a nacelle supported to the tower and a rotor raised up and installed to the nacelle in assembling the wind turbine, the rotor having a plurality of blades and being installed to the nacelle with a blade end portion protecting bag fitted onto at least one of the blades in assembling the wind turbine, the method comprising steps of: fitting the end bag mentioned above onto at least one of the blades and connecting a control rope to the belt-like members at the center portion, and installing the rotor to the nacelle using the crane to hoist the rotor while drawing the control rope to control the position of the rotor onto which the end bag is fit.

In such a rotor installing method for installing the rotor to the nacelle with a blade end portion protecting bag fit onto the blade, the end bag is fit onto the blade end portion of at least one of the blades, and the control rope is connected to the belt-like members at the center portion, then installing the rotor to the nacelle using the crane to hoist the rotor while drawing the control rope to control the position of the rotor onto which the end bag is fit. Therefore, the rotor can be installed to the rotor while damage to the blades is reduced.

As mentioned above, in the present invention, at least two belt-like members fixed to the outer surface of the end bag in its circumference are disposed to radiate from a center portion virtually provided outside the end bag, and the control rope is connected to the two belt-like members extending straight at the center portion. Therefore, the drawing force acting to the end bag is spread over a broad region of the blade end portion. Therefore, even if the drawing direction of the control rope is changed, damage to the rear edge portion of the blade can be reduced. Further, the space is provided at the end portion of the end bag having the highest possibility to be damaged in normal end bag, and therefore the damage to the rear edge portion of the blade can be reduced. Furthermore, it is possible to reduce acting a force of such direction that the adhesive sewing portion or bonding portion between the end bag and the belt-like member is broken off. Further, the belt-like members are bunched up using the ring-like member, and therefore damage to the belt-like members and the control rope can be reduced.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

Figure 4:
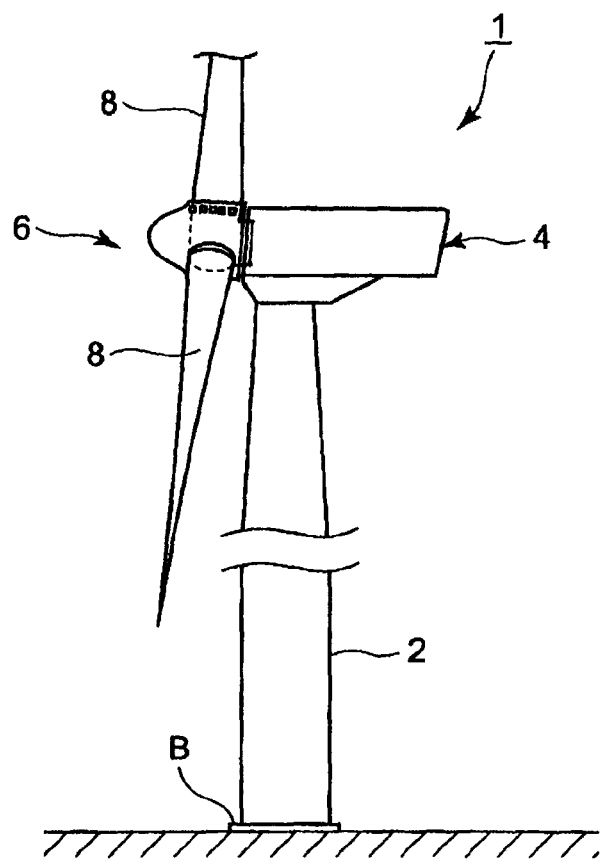
FIG. 4 is a schematic side view showing a common wind turbine to which the present invention is applied.
Figure 5:
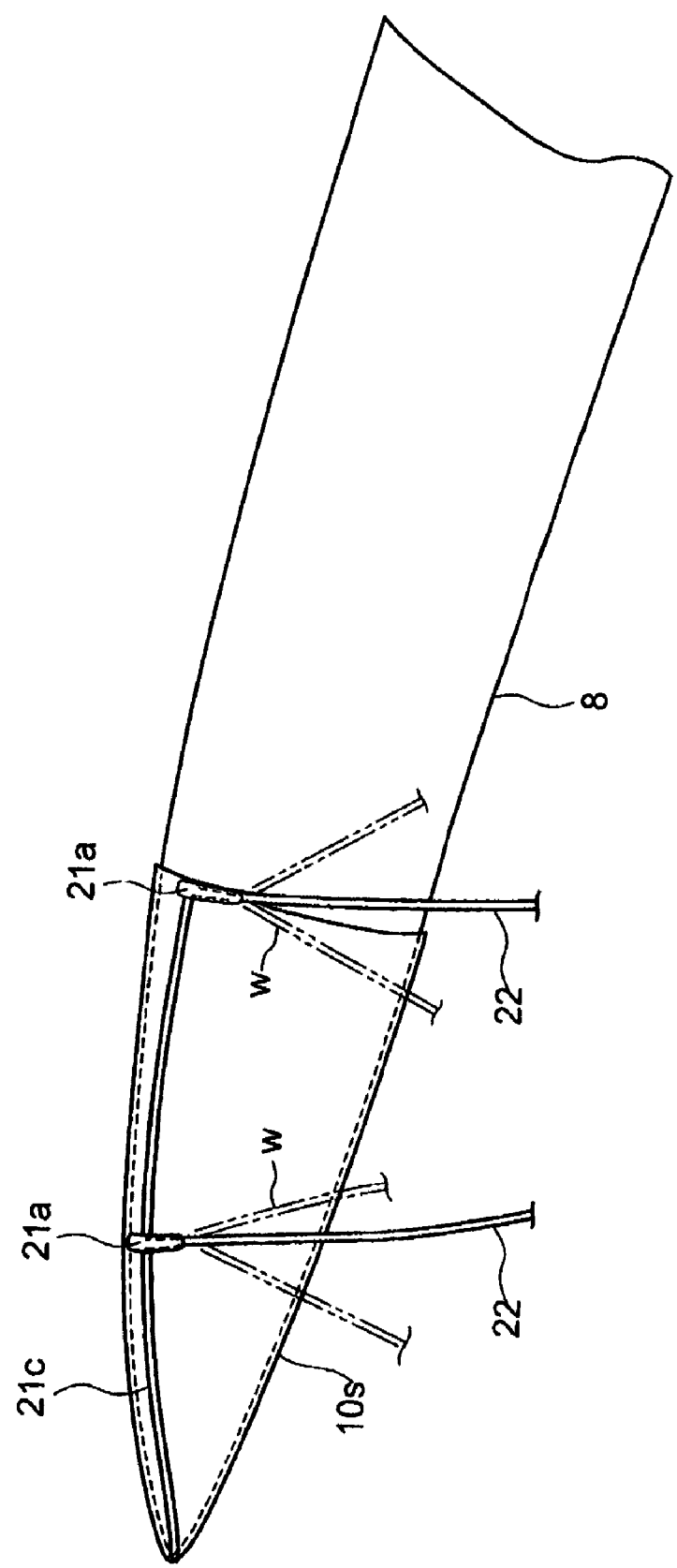
FIG. 5 is a diagram showing a partial construction when a protecting bag for blade end is used according to a prior art.
Figure 6:
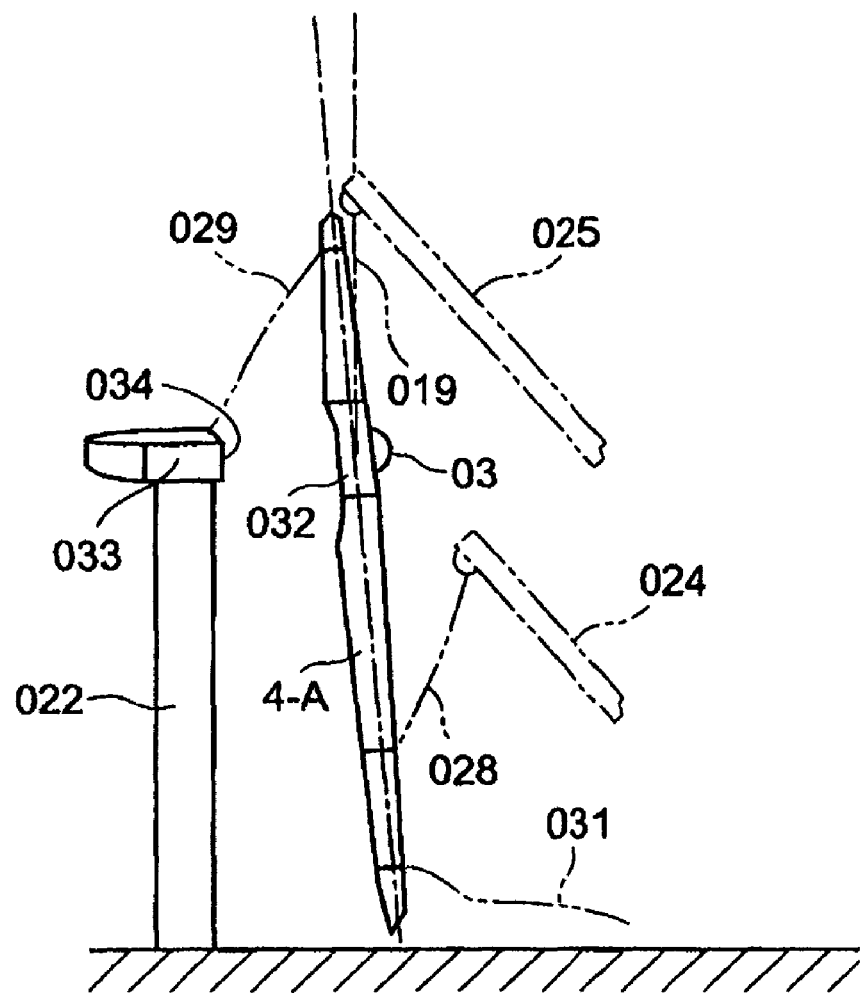
FIG. 6 is an overall perspective diagram showing an installing method for blades of a wind turbine according to a prior art.

FIG. 4 is a schematic side view showing a common wind turbine to which the present invention is applied.

A wind turbine generator 1 mainly includes, as shown in FIG. 4, a tower 2 provided to stand on a foundation B, a nacelle 4 supported on the upper end of the tower 2, a rotor head 6 provided on the nacelle 4, and a plurality of blades 8 attached to the rotor head 6.

Figure 1:
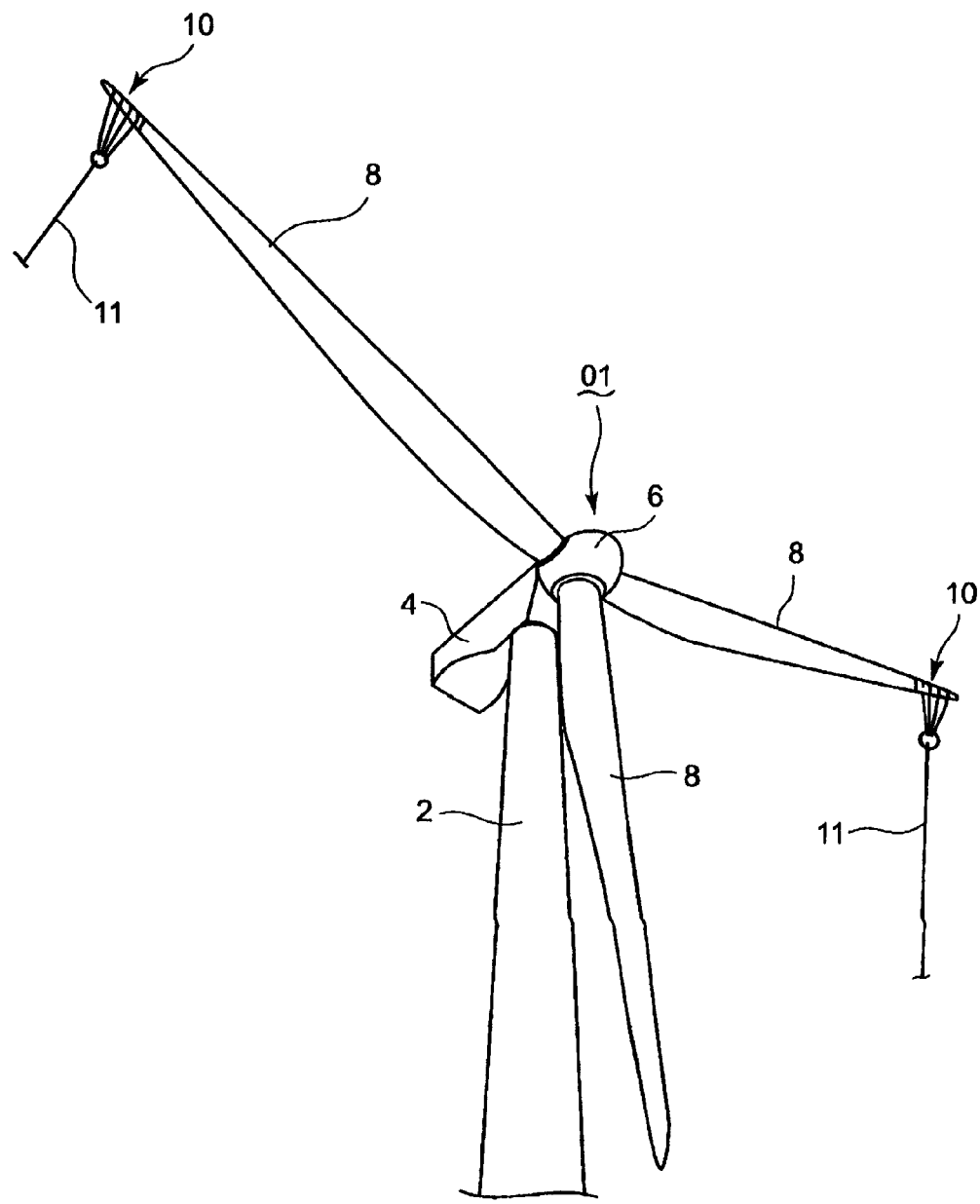
FIG. 1 is an overall perspective diagram including a protecting bag for blade end portion of a wind turbine according to an embodiment of the present invention.
Figure 2:
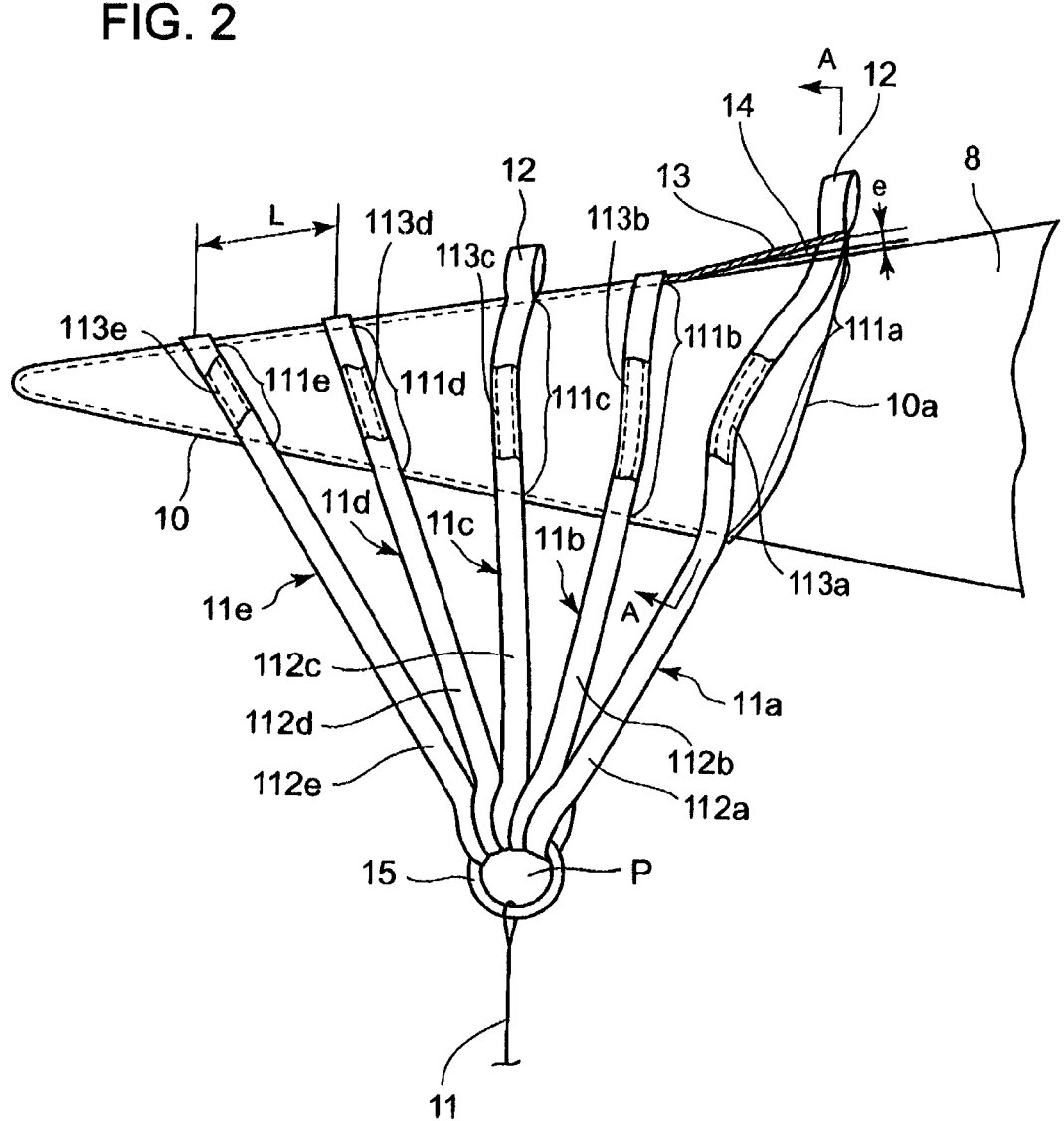
FIG. 2 is a diagram showing a partial construction when a protecting bag for blade end is used in the embodiment.
Figure 3:
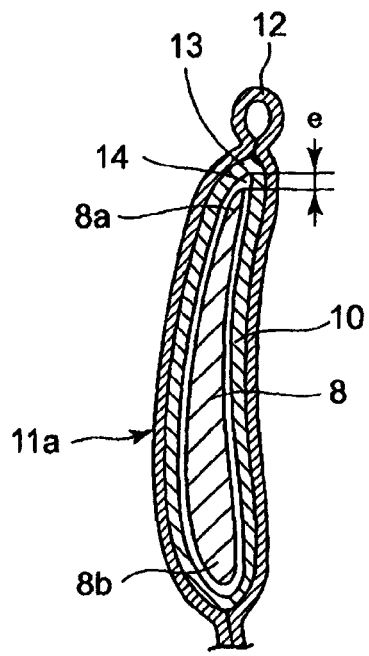
FIG. 3 is a cross-sectional view taken on line A-A of FIG. 2.

FIG. 1 is an overall perspective diagram including a protecting bag for blade end portion of a wind turbine according to an embodiment of the present invention. FIG. 2 is a diagram showing a partial construction when a protecting bag for blade end is used according to the embodiment. FIG. 3 is a cross-sectional view taken on line A-A of FIG. 2.

Referring first to FIG. 1, a wind turbine 01 constituting the wind turbine generator 1 includes, as same as shown in FIG. 4, a tower 2 provided to stand, a nacelle 4 supported on the upper end of the tower 2, a rotor head 6 provided on the nacelle 4, and a plurality of blades 8 attached to the rotor head 6. The nacelle 4 supports the rotor head 6 and accommodates a speed-increasing gear and a generator. The rotor head 6 and the plurality of the blades 8 constitute a rotor.

In assembling the wind turbine 01, an end bag 10 is fit onto each end portion of all blades 8 (three blades in this embodiment) or at least one selected blade 8 (two blades in this embodiment) so as to cover the same in a predetermined length from the end of the blade. The end bag 8 is made from a relatively soft material having high tension and being hard to tear such as hemp material, vinyl material, cloth material, etc.

Numeral 11 shows a control rope connected to the end bag 10. This rope 11 is for drawing the rotor 11 to control the position of the same when the rotor including the rotor head 8 and the plurality of the blades 8 are hoisted to the position of the nacelle 4 located on the top of the tower.

FIGS. 2 and 3 are diagrams respectively showing a partial construction of the end portion of the blade 8 equipped with the end bag 10 and its cross-sectional view, respectively. At least two belt-like members, for example, as shown in the Figures, five belt-like members 11$a$, 11$b$, 11$c$, 11$d$, 11$e$ include fixed portions 111$a$, 111$b$, 111$c$, 111$d$, 111$e$ with seams 113$a$, 113$b$, 113$c$, 113$d$, 113$e$ which are fixed by sewing to the outer surface of the end bag 10 in its circumference, and peripheral belt portions 112$a$, 112$b$, 112$c$, 112$d$, 112$e$, and extend to radiate from a center portion P virtually provided outside the end bag.

These five belt-like members 11$a$, 11$b$, 11$c$, 11$d$, 11$e$ are made from fiber material having high tension.

The five belt-like members 11$a$ to 11$e$ are fixed to the end bag 10 with an enough size of interval L with each other and radiate from a center portion P virtually provided outside the end bag, and therefore each of the belt-like members 11$a$ to 11$e$ is disposed to extend straight.

As shown in FIGS. 2 and 3, the blade 8 includes a rear edge portion 8$a$ and a front edge portion 8$b$. Each interval between the belt-like members 11$a$, 11$b$, 11$c$, 11$d$, 11$e$ is bigger at the rear edge portion 8$a$ side which is thinner than the front edge portion 8$b$, and smaller at the front edge portion 8$b$ side. Therefore, the load from the belt-like members is spread at the thinner rear edge portion 8 side so that the load from the belt-like members is not concentrated, thereby enabling to reduce damage.

Further, belt straps 12 for hooking a guide member or the like are formed in the rear edge portion side of a part of the belt-like members 8.

The belt-like member 11$a$ which is nearest to the opening portion 10$a$ of the end bag 10 among the belt-like members 11$a$ to 11$e$ and the opening portion 10$a$ of the end bag 10 are constituted as follows:

As shown in FIGS. 2 and 3, a portion of the end bag 10, which is corresponding to an inside portion of the belt-like member 11$a$ (a back side portion of the belt-like member 11$a$), is projected to form a projecting portion 13 so that a space 14 is formed between the projecting portion 13 and the thinner rear edge portion 8$a$ of the blade 8. This space 14 is, as shown in FIG. 2, a space is gradually decreased from the width e at the edge of the opening portion 10$a$ and approximately zero at the position in which the belt-like member 11$b$ is fixed, whereby the space 14 is formed as an inclined space. The contact between the rear edge portion 8$a$ and the end bag 10 is gradually gone away by inclining the space 14.

The belt-like members 11$a$, 11$b$, 11$c$, 11$d$, 11$e$ are connected to a metal ring 15 having low friction (alternatively, can be made from resin material having low frictional coefficient) at the center portion P.

In the embodiment, the metal ring 15 is arranged to have low frictional material and shape, and bunches up the foot portions of the plurality of the belt-like members. Therefore, the force from the metal ring 15 can act on the belt-like members evenly.

Further, since the belt-like members 11$a$ to 11$b$ and the control rope 11 are connected with each other via the metal ring 15, the friction in the connecting portion is reduced.

Therefore, the connecting portion between the belt-like members and the control rope is prevented from being cut by such friction, thereby enabling to improve the durability.

Next, a process for installing the blades 8 to the nacelle 4 equipped with the end bag will be described.

In assembling the wind turbine 01, at first, the end bag 10 is fit onto each end portion of all blades 8 (three blades in this embodiment) or at least one selected blade 8 (two blades in this embodiment) so as to cover the same in a predetermined length from the end of the blade 8. It should be noted that the end bag 10 is fit onto the blade 8 in a way that the projecting portion 13 formed in the opening portion 10$a$ of the end bag 10 is positioned at the rear edge portion 8$a$ side fit onto the blade with 8 whereby a space 14 is formed between the projecting portion 13 and the rear edge portion 8$a$ of the blade 8.

Then, while a plurality of the foot portions of the belt-like members extending to radiate are bunched up at the center portion P, the control rope is connected to the belt-like members 11$a$ to 11$d$ via the metal ring 15. Further, the top of the rotor head 6 is hoisted by a crane. During such hoisting, the position of the rotor is controlled by drawing the control ropes 11 which are connected to two blades 8 located in the left side and the right side and equipped with the end bag 10, respectively. Finally, the rotor head 6 is installed to the nacelle when reaching to a predetermined position.

Next, the working-effect of the embodiment will be described.

The five belt-like members 11$a$ to 11$e$ fixed to the end bag 10 in circumference equipped to the blade 8 are disposed to radiate from the center portion P so that the belt-like members extend straight. Therefore, even if the direction of the control rope is changed, a break of a specified one of the seams 113$a$ to 113$e$ can be reduced. Consequently, damage to the end bag 10 or the belt-like members 11$a$ to 11$e$ is avoided so that the durability can be improved.

Further, because the at least two belt-like members are disposed to radiate, a drawing force acting to the belt-like members and the end bag from the control rope is spread over a broad region of the blade end portion. Therefore, it is possible to avoid the drawing force of the control rope from acting directly to the blade end portion thereby enabling to reduce damage to the rear edge portion of the blade.

The projecting portion 13 is formed by projecting a part of the end bag 10 inside the belt-like member 11$a$ located in the opening portion 10$a$ side, so that the space 14 is formed between the projecting portion 13 and the thin portion of the blade. That is, a shape of the end bag 10 is for fitting onto the blade more loosely in the opening portion 10 side than in the other portions. Therefore, the contact between the opening end portion of the end bag 10 and the blade 8, which has a high possibility of being damaged, can be reduced.

Especially, since the rear edge portion 8$a$ of the blade end portion is thin and therefore easily damaged, it is effective to provide the space 14 at the rear edge portion 8$a$ side.

In other words, even if the direction of the drawing direction is changed, the space 14 between the opening portion 10$a$ of the end bag 10 and the thin portion, i.e., the rear edge portion 8$a$, absorbs the contact of the opening portion 10$a$ against the rear edge portion 8$a$, and therefore damage may caused by the opening portion of the end bag 10 can be prevented.

In this embodiment, the five belt-like members 11$a$ to 11$e$ are provided. However, it is possible to arrange to provide only one belt-like member other than the belt-like member 11$a$ which is nearest to the opening portion 10$a$ of the end bag 10.

Further, it is possible to arrange that the space 14 is gradually decreased from the position of the belt-like member 11*a* and lastly zero (0) at the position of the belt-like member 11*e*.

The invention claimed is:

1. A blade end portion protecting bag for protecting a blade end portion for a wind turbine which includes a nacelle supported on the top of a tower and a rotor having a rotor head and a plurality of blades, the rotor being raised up and installed to the nacelle in assembling a wind turbine, the blade end portion protecting bag being used in installing the rotor and comprising:
    an end bag fit onto the blade end portion to cover the same in a predetermined length from the end of the blade,
    at least two belt-like members disposed to radiate from a center portion virtually provided outside the end bag, the at least two belt-like members being fixed to the outer surface of the end bag in its circumference,
    wherein foot portions of the belt-like members are bunched up at the center portion, and a control rope is connected to the belt-like members at the center portion.

2. A blade end portion protecting bag according to claim 1, wherein the end bag includes a projecting portion formed by projecting a part of the opening end portion of the end bag so as to provide a space between the projecting portion of the end bag and a thin portion of the blade.

3. A blade end portion protecting bag according to claim 1, further comprising:
    a ring-like member provided at the center portion to bunch up the belt-like members,
    wherein the control rope is connected to the ring-like member.

4. A rotor installing method for a wind turbine including a nacelle supported to the tower and a rotor having a rotor head and a plurality of blades, the rotor being raised up and installed to the nacelle with a blade end portion protecting bag fit onto the blades in assembling the wind turbine, the method comprising steps of:
    fitting an end bag according to any of claims 1 to 3 onto the blade end portion of at least one of the blades and connecting a control rope to the belt-like members, and
    installing the rotor to the nacelle while pulling the control rope to control the rotor position.

* * * * *